United States Patent [19]

Stanley

[11] 4,050,319
[45] Sept. 27, 1977

[54] LINEAR ACTUATOR

[76] Inventor: Richard B. Stanley, 17763 G Drive North, Marshall, Mich. 49068

[21] Appl. No.: 649,693

[22] Filed: Jan. 16, 1976

[51] Int. Cl.² .......................................... F16H 27/02
[52] U.S. Cl. ............................. 74/89.15; 74/424.8 R
[58] Field of Search ............... 74/459, 89.15, 424.8 R, 74/424.8

[56] References Cited

U.S. PATENT DOCUMENTS

| 3,004,445 | 10/1961 | Mondon | 74/459 |
|---|---|---|---|
| 3,244,021 | 4/1966 | Antila | 74/459 |
| 3,861,221 | 1/1975 | Stanley | 74/459 |
| 3,861,226 | 1/1975 | Stanley | 74/459 |

Primary Examiner—Samuel Scott
Assistant Examiner—Wesley S. Ratliff, Jr.
Attorney, Agent, or Firm—McWilliams & Mann

[57] ABSTRACT

A linear actuator of the threaded shaft actuator type comprising a rotary threaded shaft and a special bearing unit secured to the member to be moved linearly, in which the bearing unit comprises a plurality of rollers each having a plurality of radial right flanges intermediate their ends spaced apart and scheduled to complement the pitch of the shaft threading for rolling engagement herewith, which rollers at their ends are formed with thrust bearing surfaces that are angled relative to their axes that ride on spaced apart annular raceways defined by an outer race structure which in turn is secured to the member to be moved linearly. The roller flanges are formed with thrust transmitting faces angled with respect to the longitudinal axes of the respective rollers and shaped to substantially complement the shaft threading. Canting of the rollers with respect to the outer race is avoided by making the angulation of the roller bearing surfaces greater than the angulation of the roller thrust transmitting faces.

10 Claims, 11 Drawing Figures

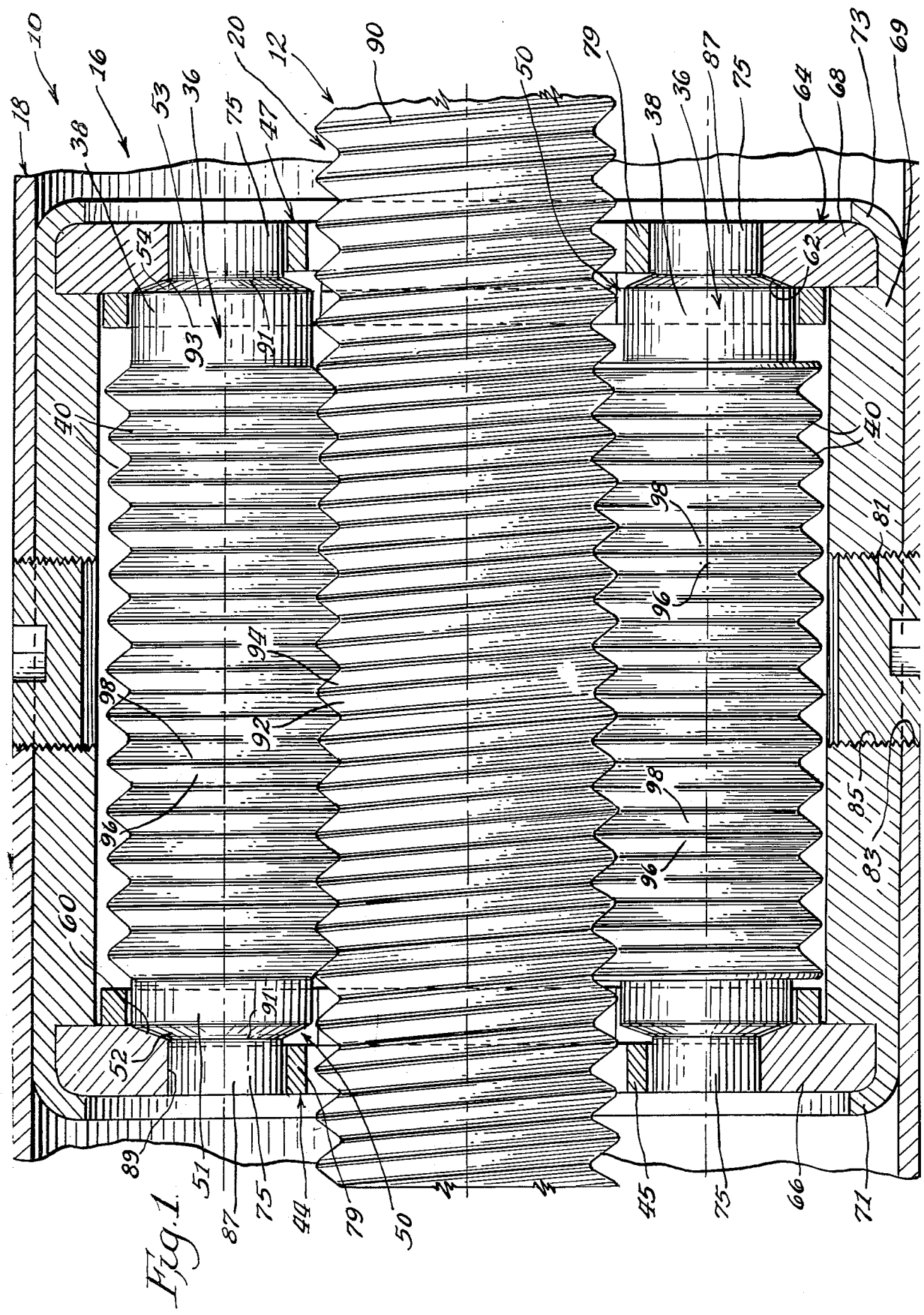

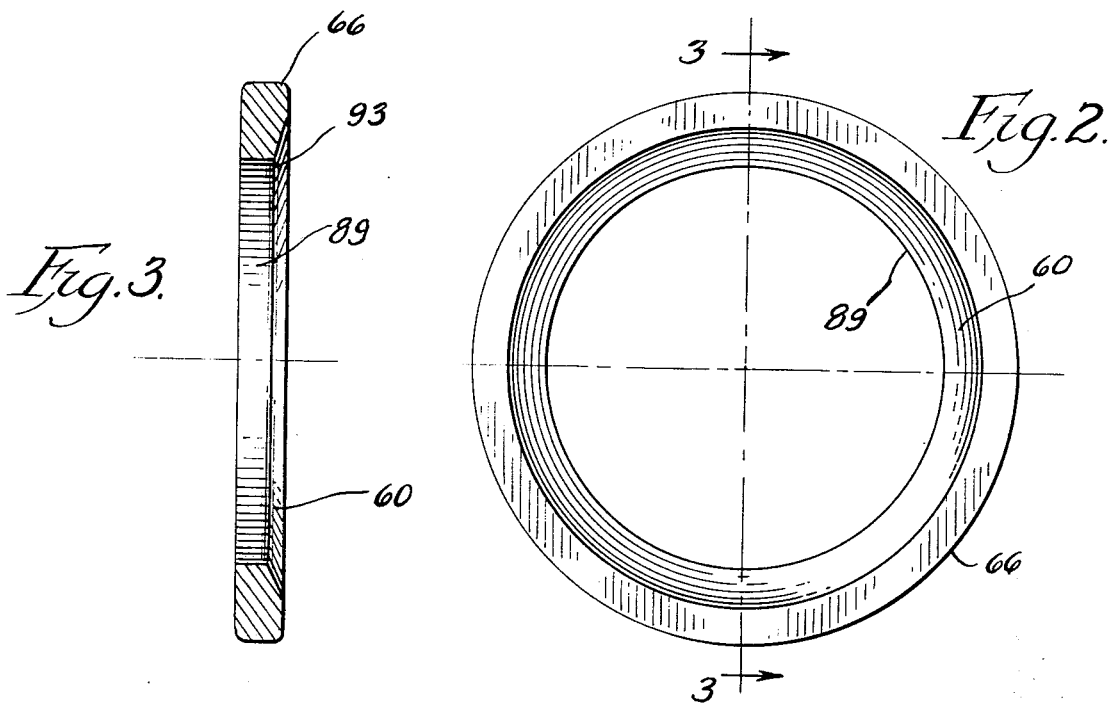
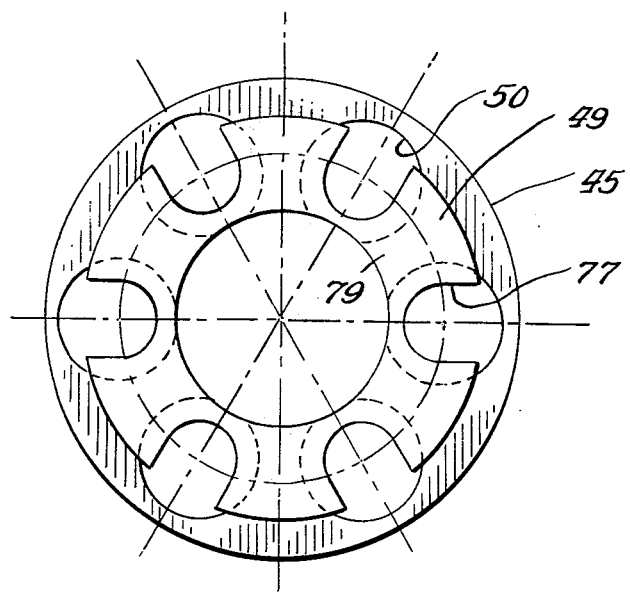
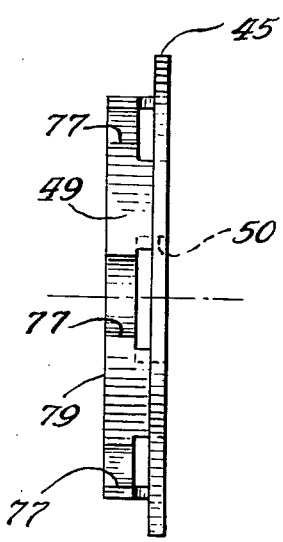

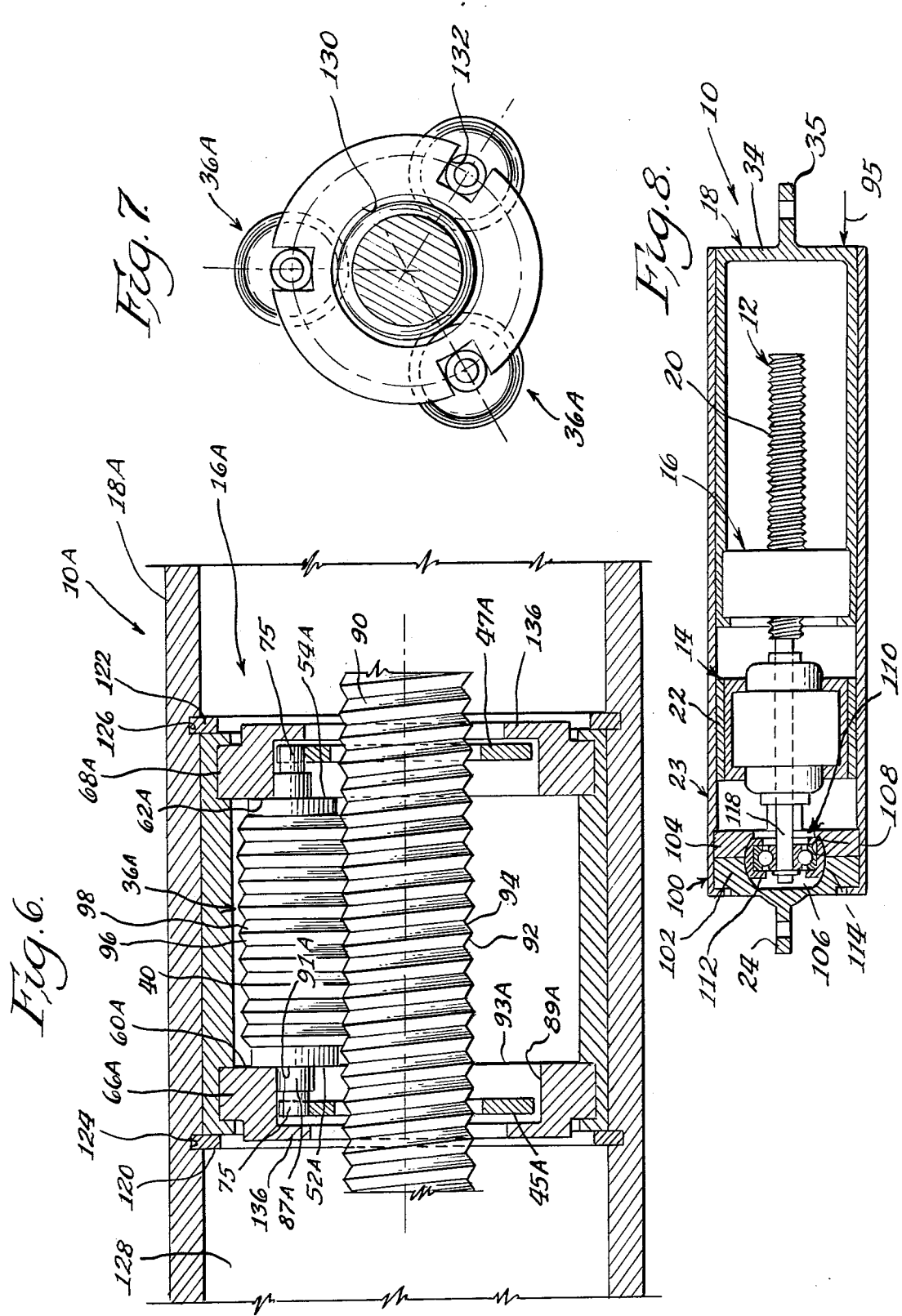

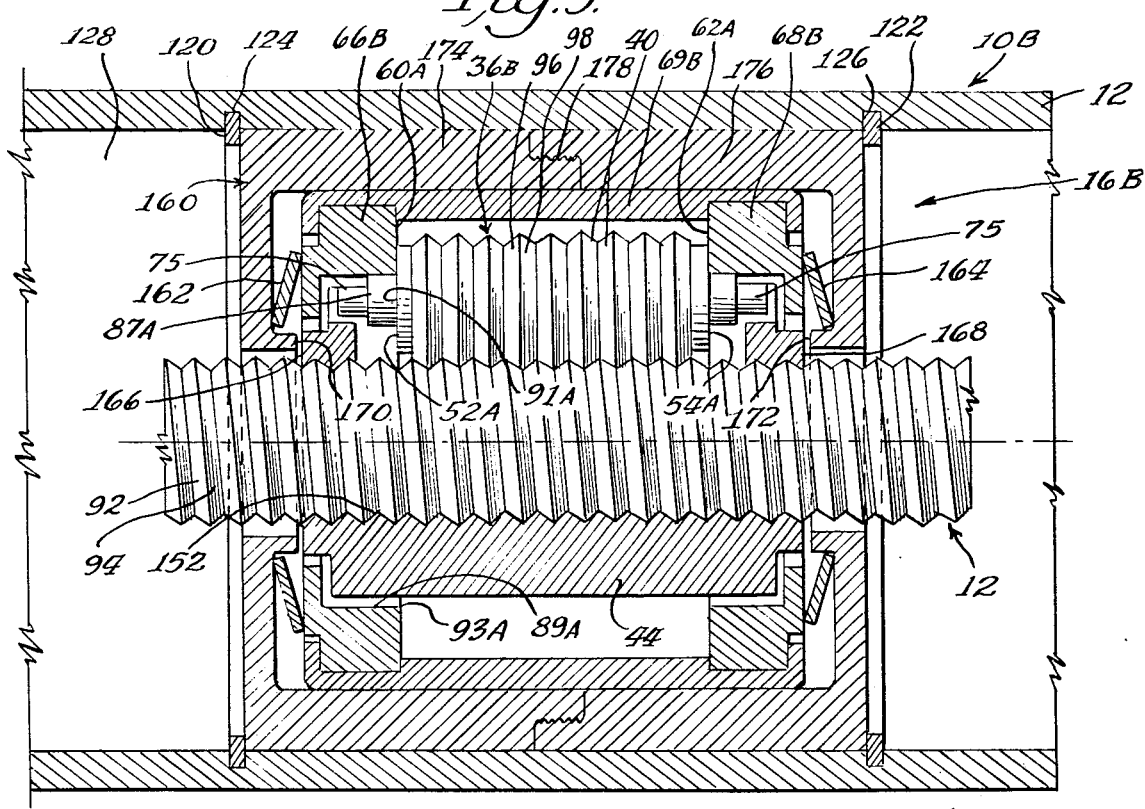
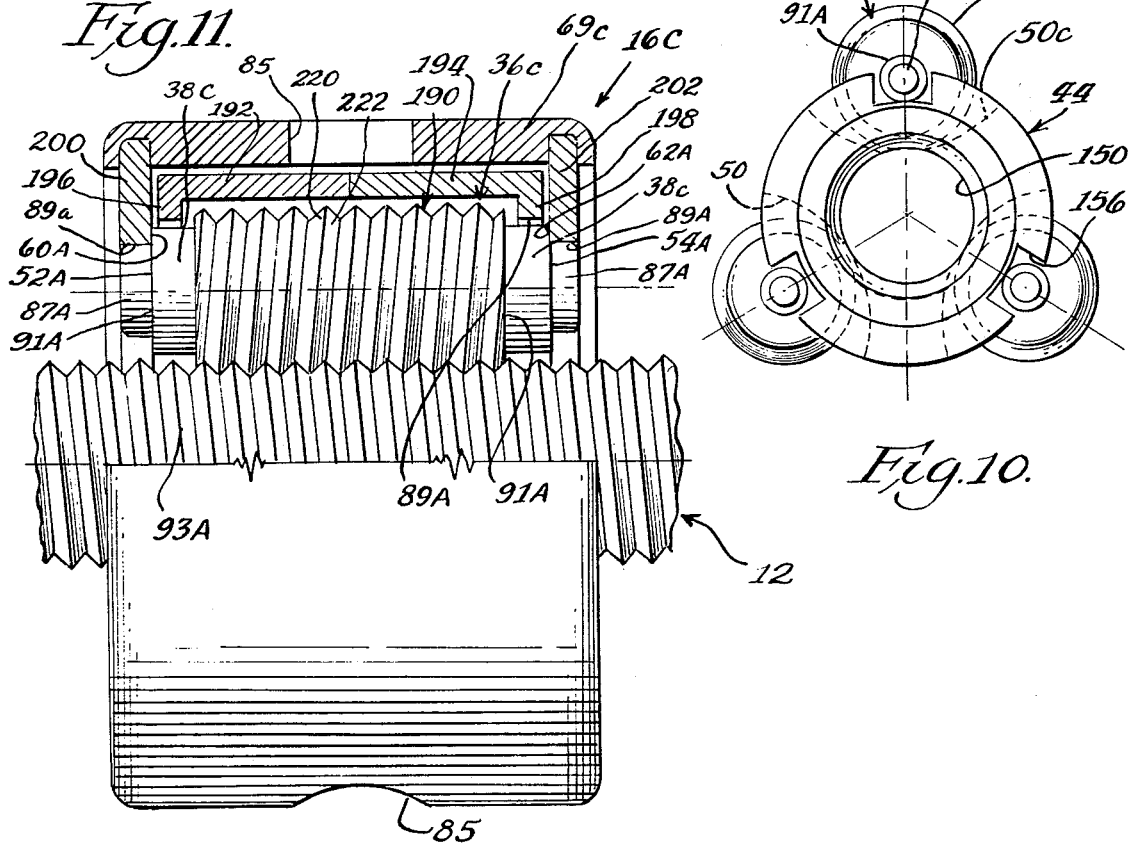

LINEAR ACTUATOR

This application is related to my copending application Ser. No. 453,326, filed Mar. 21, 1974 (now U.S. Pat. No. 3,965,761), the filing date of which is claimed for all subject matter hereto that is common thereto. Reference is also made to my U.S. Pat. No. 3,861,226, granted Jan. 21, 1974, the disclosure of which is hereby incorporated by this reference.

My invention relates to, broadly speaking, a linear actuator, and more particularly, to a device for converting rotary motion to linear motion with high force conversion factors over any desired distance at low speed, and the present application deals with linear actuator arrangements of the general type described in my said application Ser. No. 452,326 and my said U.S. Pat. No. 3,861,226.

Prior to my said patent, existing mechanical devices in general use for converting rotary motion to linear motion fell into one of the three basic groups, namely, screw and nut devices, which provide reasonable force conversion ratios at low efficiency, ball and nut devices, which provide high efficiency, but with low force conversion ratios, and rack and gear devices which provide low force conversion ratios at low efficiency. Prior to the Applicant's inventions, there was no known mechanical method, insofar as the Applicant is aware, for converting rotary motion to linear motion with both high force conversion ratios and high efficiency.

Furthermore, while the common solenoid type device provides low force application at high speed for short distance using electrical energy, so far as the Applicant is aware, there has not been in general use, prior to his said patent, any practical method of using electrical energy to provide high force at low speed over a comparatively long distance.

My said application and patent discloses a linear actuator of wide basic utility employing a shaft member, a tubular member telescopingly receiving the shaft member, and a special bearing unit interposed between the shaft and the tubular member in which one of the members is threaded, and the bearing unit comprises a plurality of free rolling roller elements each formed with right radial flanges and flutes or grooves proportioned for meshing engagement with the threads of the threaded member; the rollers have separate thrust resisting surfaces that cooperate with the raceway of the other member in resisting radial loads. The roller elements are free of any mounting or restraining bearings, have the orientation of their flanges scheduled in accordance with the pitch of the threading, and have thrust loads applied to their shanks so that all the rollers take thrust loads to an extent not heretofore thought possible.

Either the shaft member or the tubular member can be the threaded member, and either member can be the driving member (to move the other linearly), preferably using a suitable conventional electrical motor. The drive is performed through the rolling friction of the bearing parts involved, which is generated by the resistance encountered, the arrangement being such that the greater the load to be handled, the greater the friction there is available to handle it.

In one embodiment of the invention, it is the tubular member that is threaded, and the shaft that is driven, and as an example of the possibilities involved, the threading of the tubular member may be pitched in accordance with any desired force conversion factor, such as, for instance, 300 to 500 to 1, and the tubular member can be of such length, as may be necessary or desirable, to provide linear movement of the tubular member at high force over the desired distance. As only rolling friction is involved in the motion converting bearing unit and its relation to the driving shaft and driven tubular member, efficiency is on the order of at least 90 per cent. The bearing unit involved is no larger than conventional ball bearing units for journaling shafts.

The present invention is concerned with improving and simplifying linear actuator arrangements of this general type.

A principal object of the invention is to provide a linear actuator arrangement that has high load carrying capacity, that operates at low speed over any desired distance, that is composed of a few and simple parts adapted for inexpensive manufacturing operations, and that operates at efficiencies at least on the order of 90 per cent.

Another principal object of the invention is to provide a motion translating bearing unit for use with threaded shafts to convert rotary motion to linear motion that is comparable in simplicity to the ordinary conventional ball bearing units commonly employed for shaft journalling purposes, but which is arranged for ready mounting and securement to parts to be moved linearly on rotation of the threaded shaft.

Another important object of the invention is to provide a bearing unit of the motion translating type employing free rolling unjournaled flanged rollers of the type disclosed in my said application, which is arranged to avoid canting of the rollers without having to journal them in cages or spacers.

Other objects of the invention are to provide a linear actuator bearing arrangement that provides the efficiency advantages of ball nut devices at a fraction of their cost, to provide a linear actuator arrangement of the type indicated in which the motion translating components operate with a coefficient of friction less than the tangent of the threading helix angle, and to provide a linear actuator arrangement that is economical of manufacture, convenient to install and use, and is susceptible of a wide variety of applications for general purpose use.

In accordance with this invention, a linear actuator arrangement of the rotatable threaded shaft type is provided which is concerned with a simplified bearing unit arranged for ready connection to the member to be moved linearly, as well as ready operable association with the shaft. The bearing unit comprises a plurality of rollers, ordinarily three to six in number, each having a plurality of right radial flanges spaced apart and scheduled to complement the pitch of the shaft threading for rolling interfitting engagement with the shaft threading. The rollers at their ends are formed with both thrust bearing surfaces that are angled relative to their longitudinal axes and separate but adjacent radial surfaces, which surfaces ride on correspondingly located thrust and radial surfaces on spaced apart raceways of an outer race structure that is arranged for securement to the member to be moved linearly. Following the teachings of my said application, the rollers are free rolling and are unjournaled at their ends, and no spacing device is required as their interfitting with the shaft threading together with the scheduling of their flanges along their shanks for that purpose, achieves that end. The bearing unit is provided with means for supporting the flanged rollers radially when the shaft is separated from the bearing unit, to facilitate reapplication of the shaft to the bearing unit.

The roller flanges define thrust transmitting surfaces or facts that substantially complement the corresponding thrust transmitting surfaces or faces of the threaded shaft.

In accordance with the present invention, the angulation of the roller bearing thrust resisting surfaces exceeds that of the roller flange thrust transmitting faces, with respect to the longitudinal axis of the respective rollers. For instance, assuming that the threaded shaft has 45 degree angle "V" threading pursuant to said application, and the roller flanges that mesh the same are similarly configured, the roller flanges define thrust resisting side faces or surfaces that are angled at 45° relative to the longitudinal axis of the respective rollers. The angling of the roller thrust resisting end surfaces then should be in the range of 46° – 90° with respect to the longitudinal axis of the respective rollers, to provide the canting resisting loading of the rollers that is contemplated by the present invention.

Other objects, uses and advantages will be obvious or become apparent from a consideration of the following detailed description and the application drawings in which like reference numerals indicate like parts throughout the several views.

In the drawings:

FIG. 1 is a longitudinal sectional view, in largely diagrammatic form, and partially in elevation, showing a specific linear actuator device embodying the principles of the present invention;

FIG. 2 is a plan view of one of the raceway forming rings employed in the device of FIG. 1;

FIG. 3 is a sectional view taken along line 3—3 of FIG. 2;

FIG. 4 is a plan view of one of the roller support rings employed in the device of FIG. 1;

FIG. 5 is an edge view of the support ring shown in FIG. 4;

FIG. 6 is a view similar to that of FIG. 1 but illustrating a modified form of the invention;

FIG. 7 is an end view of the rollers and roller support operably associated with same that are employed in the embodiment of FIG. 6;

FIG. 8 is a small scale diagrammatic longitudinal sectional view indicating the general arrangement of a linear actuator device in which the various embodiments of this invention that are disclosed herein may be incorporated, with the bearing unit being shown in block diagram form;

FIG. 9 is a view similar to that of FIG. 1 but illustrating another embodiment of the invention;

FIG. 10 is a view similar to that of FIG. 7 but showing the roller support of the embodiment of FIG. 9 and rollers associated therewith; and FIG. 11 is a view similar to that of FIG. 1 illustrating a further embodiment of the invention.

However, it is to be distinctly understood that the specific drawing illustrations provided are supplied primarily to comply with the requirements of the Patent Laws, and that the invention is susceptible of other embodiments which will be obvious to those skilled in the art, and which are intended to be covered by the appended claims.

GENERAL DESCRIPTION

Reference numeral 10 of FIGS. 1 and 8 generally indicates a linear actuator device arranged in accordance with the present invention, which comprises a threaded shaft 12 rotated by a suitable electric motor 14, bearing unit 16 operably associated with the threaded shaft 12 and arranged to convert rotary motion to linear motion, and a tubular member 18 to which the bearing unit 16 is secured or keyed for moving the tubular member 18 longitudinally of the axis of the shaft 12 on operation of the motor 14 to rotate the shaft 12.

The shaft 12 is provided with external threading 20 which in the form shown is preferably of the V type having 45 degree angulation. Shaft 12 is suitably connected to the driving components of the motor 14, which driving components are housed in suitable motor housing 22 that in the form shown is suitably mounted in actuator housing 23 and includes a suitable bracket 24 for securement to one of the structures that the actuator 10 is to be secured between.

In the form shown, the tubular member 18 is slidably received within housing 23 for movement longitudinally thereof and has a closed end 34 provided with suitable attachment bracket 35 adapted for securement to the other component that the actuator 10 is to be secured to for moving one of such components with respect to the other.

Referring specifically to the bearing unit form of FIG. 1, the bearing unit 16 generally comprises a plurality of rollers 36 (six in the embodiment of FIGS. 1 – 5) each having their shanks 38 formed to define a plurality of right radial flanges or ridges 40 having the same pitch as the threading 20, and of 45° angulation for complementary interfitting therewith to be in rolling relation thereto. In accordance with my said patent and said patent application, the ridges or flanges 40 are scheduled longitudinally of the shanks of the respective rollers 36 in accordance with the circumferential location of the particular rollers 36 in bearing unit 16 to accommodate the lead of the threading 20.

The individual rollers 36 are received in roller support 44 which comprises a pair of spaced apart support rings 45 and 47 having the configuration indicated in FIGS. 4 and 5 to define spaced operating cavities or recesses 50 that, in the assembled relation of the bearing unit 16, are aligned transversely of the bearing unit to receive the individual rollers 36 at the ends 51 and 53 of their respective shanks 38. Following the teachings of my said patent and patent application, the rollers 36 are not journaled in the support 44, but rather are loosely received in the respective cavities 50. The interfitting of the roller flanges 40 of the respective rollers with the shaft threading 20 effects the desired circumferential spacing of the rollers 36 about the shaft, in accordance with the scheduling of the flanges 40 of the respective rollers 36.

The rollers 36 are each formed with thrust transmitting bearing surfaces 52 and 54 at their respective ends 51 and 53, which ride on the respective raceways 60 and 62 of the bearing unit outer race structure 64. In the form of FIGS. 1 – 5, the outer race structure 64 comprises a pair of ring members 66 and 68 assembled in spaced apart relation, by being applied to retainer sleeve 69. In this embodiment of the invention, the sleeve 69 has its ends 71 and 73 turned over the peripheries of the race rings 66 and 68, respectively, to hold the bearing components in assembled relation as a subassembly. The rollers 36, in the form of FIGS. 1 – 5, are provided with extensions 75 at either end of same which are disposed in the reduced U shaped portions 77 of the respective roller support rings 45 and 47 to support the rollers 36 adjacent the race rings 66 and 68 when the bearing unit 16 is disassociated from shaft 12. The roller extensions 75 define cylindrical surfaces 87 which are to ride on the cylindrical surfaces 89 of the respective race rings 66 and 68. Thus, rollers 36 and outer race ring members 66 and 68 have both cooperating thrust resisting or transmitting surfaces 52 and 60, and 54 and 62, as well as separate cooperating radial surfaces 87 and 89.

The roller extensions 75 serve, however, no roller journaling purposes, and in practice the extensions 75 are spaced from all the surfaces of the retainer rings 45 and 47 which define the respective cavities 50, when the bearing unit is operatively associated with the shaft 12. The roller extensions 75 do come into play, in cooperation with the cavity reduced portions 77, only when the bearing unit 16 is separated from the shaft. Note that the cavity reduced portions 77 are closed about the inner margin 79 of rings 45 and 47.

The sleeve 69 is suitably keyed to tubular member 18, as by having suitable detents 81 threadedly applied to opposed openings 83 formed in the tubular member 18 to extend into correspondingly located openings 85 formed in the sleeve 69.

As seen in FIGS. 2 and 3, wherein the race ring 66 is illustrated, the race rings 64 and 66 are of annular configuration and are free of geared or threaded connection to the rollers 36 and shaft 12. They receive the extensions 75 of the rollers 36 and the reduced end portions 49 of the respective support rings 45 and 47, with the roller extensions 75 in rolling, radial load transmitting relation with the ring inner surfaces 89. As indicated in FIG. 1, the support rings 45 and 47 are free of threaded engagement with the shaft 12. The support rings 45 and 47 are loosely received between the outer race rings 64 and 66 and perform no load or motion transmitting functions. As indicated, their purpose is to support the rollers 36 adjacent the respective raceways surfaces 60 and 62 when the bearing unit is separated from the shaft 12.

In the assembled relation of the linear actuator 10, and specifically in the assembled relation of the bearing unit 16 with the shaft 12, the rollers 36 have their flanges 40 in rolling relation with the threading 20 of the shaft 12, and have their shanks in rolling relation with the respective raceway surfaces 60, 62 and 89 of the outer race structure 64.

It will be observed that the thrust bearing surfaces 52 and 54 of the rollers 36 and the raceway surfaces 60 and 62 are of complementary frusto-conical configuration and are angled relative to the longitudinal axes of the respective rollers as well as the axis of the shaft. The shaping of these surfaces is in the complemental self centering manner.

The shaft threading 12 is of the single thread type, with the single thread 90 involved defining on either side of same a pair of thrust transmitting surfaces or faces 92 and 94 which are operably associated with the flanges 40 of the respective rollers 36. The flanges 40 of the rollers 36 are formed to have a cross sectional shaping, longitudinally of the respective rollers 36, that complements the cross sectional shaping of the thread 90 longitudinally of the shaft 12. Thus, the flanges 40 also each define on either side of same a pair of frusto-conical thrust transmitting surfaces or faces 96 and 98 which cooperate with the respective, substantially complementing, surfaces or faces 92 and 94 of the shaft thread 90.

In accordance with the present invention, the angulation of the roller thrust bearing surfaces 52 and 54 is so related to the angulation of the thrust transmitting faces or surfaces 96 and 98 of the respective rollers 36 such that the rollers 36 are biased, by radial loads applied to same, against tendencies to cant, when thrust loads are acting through the rollers 36, either by having same applied thereto through race rings 64 and 66, or by having same applied thereto through the shaft threading 20 acting on the surfaces 96 and 98 of the roller flanges 40.

More specifically, the invention contemplates that the angulation of the roller thrust bearing surfaces 52 and 54 and the thrust resisting surfaces they engage, with respect to the longitudinal axes of the respective rollers, will exceed the angulation of the roller flange surfaces 96 and 98 and the thrust resisting surfaces they engage with respect to the individual roller longitudinal axes. It has been found that so long as this relationship is observed, application of thrust forces to the rollers 36 results in an application of sufficient radial force to same, and specifically, results in sufficient radial loading of the roller surfaces 87 against raceway surfaces 89, to resist tendencies of the rollers 36 to cant to one side or the other of substantial parallelism with shaft 12. This is achieved by an outward camming action of the shaft threading 20 on the roller flanges 40 that obtains when the roller flange and radial and thrust bearing surfaces have the relationship indicated.

As an example, since the surfaces 96 and 98 are at 45 degree angles with respect to the longitudinal axes of the respective rollers 38, the surfaces 52 and 54 of the respective rollers, and the raceway surfaces 60 and 62 they cooperate with, should be angled at least 46° and up to a maximum of 90°, with respect to the said longitudinal axes of the respective rollers. In a preferred embodiment of the invention, the surfaces 52 and 54 are angled at approximately 75 degrees with respect to the longitudinal axes of the respective rollers.

As a further example, standard V shaped threading for shaft 12 may be employed, in which the surfaces 96 and 98 will have an angulation of 60° with respect to the roller longitudinal axes. For this variation of the invention, the angulation of the thrust resisting surfaces 52 and 54 with respect to the longitudinal axes of the respective rollers should be at least 61° and up to a maximum of 90°. An angulation of 75 degrees is preferred for such an alternate embodiment.

It is a characteristic of the invention that the thrust and radial surfaces 52, 54 and 87 of rollers 36, and the corresponding thrust and radial surfaces 60, 62 and 89 of the race rings 66 and 68 (and their equivalents in other embodiments) be adjacent each other and merge at a corner; thus, roller thrust surfaces 52 and 54 merge with roller radial surface 87 at the circumambient corner 91 while race ring thrust surfaces 60 and 62 merge with the respective race ring thrust surfaces at circumambient corners 93. With this relationship of parts, roller extensions 75 may be appropriately proportioned for having the radial surfaces 87 of all the rollers 36 in rolling engagement with race ring radial surfaces 89, and making thrust surfaces 52, 54 and 60 within acceptable tolerance ranges, the race ring thrust surfaces can be pressed into rolling engagement with the respective roller thrust surfaces 60 and 62 by appropriately preloading the race rings 66 and 68 toward each other. The roller and race ring thrust and radial surfaces involved are thus composite thrust and radial force transmitting surfaces of complemental nature.

Assuming that the actuator 10 is assembled in the manner indicated in FIGS. 1 and 8, on rotation of the shaft 12 by motor 14, the rollers 36, being in tractional rolling engagement with the shaft threading 20, are actuated by rolling friction to roll about the shaft 12 and the outer race structure raceways 60 and 62, with which the rollers 36 are also in tractional rolling relation at the radial and thrust surfaces involved. Assuming that the tubular member 18 is held against rotation relative to motor 14, as by application of the respective brackets 24 and 35 to the components they are to be connected to, whereby one of the components is to be moved linearly of the other, the bearing unit 16, and consequently the tubular member 18 to which it is connected, is moved to the right or to the left of FIGS. 1 and 8, depending on the direction of rotation of the shaft 12. Since the device 10 is shown in its fully contracted relation in the showing of FIG. 8, it is assumed that the direction of rotation will be such that the tubular member 18 is moved to the right of FIG. 1 to extend the device, and rotation in the opposite direction will move the tubular member 18 to the left of FIG. 1 to contract same, assuming the bracket 24 is secured to a stationary component in bracket 35 secured to the component to be moved linearly.

As disclosed in my said application and patent, the pitch of the threading 20 may be made as desired to achieve the force conversion characteristics that are designed for a particular linear actuator unit.

As the pitch of the threading defines the pitch and corresponding feed rate of device 10, and pitch is inversely proportional to the force conversion factors of the unit, in accordance with the applicable laws of mechanics, it will be seen that as zero pitch is approached, the force conversion factors approach infinity, making theoretically available large force output capabilities at slow speed where adequate purchase between the shaft 12 and the tubular member 18 can be achieved.

In the embodiments of the present application, this purchase is achieved in the same manner as disclosed in my said patent and application. Thus, assuming that a load is acting on the tubular member 18 in the direction of the arrow 95 (see FIG. 8) and the motor 14 and the parts it is connected to are held against movement, the force acting in the direction of the arrow 95 is applied to the shaft 12 through the shear relation provided by the intermeshing parts of the bearing unit 16 and the keyed connection of the bearing unit sleeve 69 to the tubular member 18. As loads are increased, friction forces, through which the rotating shaft acts on the rollers 36 (to resist a load), increase. This permits the transfer by the bearing unit 16 to the tubular member the forces made possible by the force force conversion factors involved in the particularly pitch that is used in the shaft threading 20 (either to hold the tubular member 18 against movement, or to move same linearly as desired on operation of the motor 14). Forces acting in the opposite direction provide a similar result.

In accordance with the present invention, the forces acting on the bearing unit 16 apply thrust loads to the race rings 64 and 66 which in turn apply them to the respective rollers 36 that in turn apply them to the shaft threading 20, and vice versa. By arranging the indicated angulation of the roller surfaces of faces 96 and 98 and the corresponding shaft threading surfaces 92 and 94, with respect to the indicated angulation of the roller thrust resisting end bearing surfaces 52 and 54, so that the angulation of the surfaces 52 and 54 exceeds the angulation of the surfaces 92, 94, 96 and 98, adequate radial load bias is applied to the rollers 36, against race rings 66 and 68, to hold the rollers against canting tendencies up to 25 percent of the thrust forces involved. With the relationships indicated, the thrust forces acting on the rollers are translated into thrust and radial force components by the cooperation of the shaft threading and the roller flanges, with the radial force component outwardly biasing the rollers 36 against the race ring surfaces 89 to provide the holding action on the rollers that overcomes tendencies for them to cant.

It has been found that by employing the roller-raceway thrust resisting surface angulation relationships indicated, together with the roller-raceway radial load surfaces that have been indicated, the bearing unit operates on the shaft with a coefficient of friction between the nut and the shaft that is less than the tangent of the angle of the helix employed in defining the thread 90, assuming that roller-shaft thrust cooperation of the type illustrated is employed.

In an operating embodiment in which the shaft threading 20 has a helix angled in the range of 3° to 3½ degrees, it will be found that when the bearing unit 16 is applied to a shaft 20 held in an upright position to dispose the bearing unit 16 at the upper end of the shaft threading, the bearing unit will start from a dead stop, under the action of gravity, and rotate with acceleration down the shaft, under the action of gravity. To achieve this, the coefficient of friction between the bearing unit and the shaft will be less than the tangent of the angle of the helix of the shaft threading, which is an indication of the efficiency of operation of the Applicant's invention. Efficiencies of 95 percent have been achieved in operating embodiments of the invention. The low coefficient of friction involved and the efficiencies obtained are a direct result of the Applicant being able to eliminate canting tendencies of the rollers by employing the aforedescribed angling relationships of the roller flange thrust transmitting surfaces or faces and the roller end thrust transmitting bearing surfaces.

SPECIFIC DESCRIPTION

The driving motor represented by motor 14 in the illustrated embodiments may be of any suitably reversibly driveable type. The motor 14 is therefore only diagrammatically illustrated in FIG. 8. In the specific form shown, the housing 23 includes suitable end wall structure 100 comprising a base plate 102 suitable affixed to housing 23 and having bracket 24 integrally connected therewith and inner plate 104 that is suitably secured to the base plate 102 by employing bolts or the like. The plates 102 and 104 are formed to define a cavity 106 defining spherically contoured surfacing 108 in circumambient relation thereabout in which ball bearing unit 110 is mounted by being received within a cover 112 having a spherically contoured surfacing 114 that substantially complements that of the surfacing 108. The bearing unit 110 journals an extended end portion 118 of the shaft 12.

The motor housing 22 of motor 14 is secured in its illustrated position within the housing 23 in any suitable manner.

The tubular member 18 is only diagrammatically illustrated as it can be of any desired arrangement that provides for securement of the bearing unit 16 thereto and securement of the tubular member to a component to be moved linearly, as by employing the simple bracket structure represented by bracket structure 35. Of course, it doesn't matter which bracket structure 24 or 35 is secured to the linearly movable member.

The shaft 12 is suitably keyed to the motor shaft 14, though in the form illustrated the shaft 12 is shown in the form of a continuous shaft member extending through the motor, with the understanding that the shaft is suitably keyed to the motor rotor.

With regard to the bearing unit 16, the rollers 36 and the outer race rings 66 and 68 are preferably formed from a suitable bearing steel or the like. Retainer rings 45 and 47 may be formed from a suitable steel, brass or the like and are adapted for shaping by the punch forming operations. The sleeve 69 may be likewise formed from brass or the like. The shaft 12 may be formed from a suitable shaft steel. However, the general arrangement involved is adapted for applications where the bearing unit components and the shaft could be formed from suitable plastic materials.

In the embodiment 10A of FIGS. 6 and 7, the bearing unit 16A is keyed to tubular member 18 by being interposed between a pair of lock rings 120 and 122 that are removably received in the respective annular recesses 124 and 126 formed in the inner surface 128 of tubular member 18A.

In this embodiment of the invention, the raceway thrust surfaces 60A and 62A are angled at 90° to the axes of the respective roller 36 A with the thrust bearing surfaces 52A and 54A of the respective rollers 36A being similarly angled, similar to the arrangement shown in FIG. 10 of my said U.S. Pat. No. 3,861,226. The rollers have radial surfaces 87A merging into thrust surfaces 52A at circumambient corner 91A, and race rings 66A and 68A having radial surfaces 89A, on which roller radial surfaces 87A ride, and that merge into the race ring thrust surfaces 60A and 62A respectively at circumambient corners 93A. Support rings 45A and 47A are of simplified coplanar construction following the general arrangement of FIGS. 11 and 12 of my said application. The rings 45A and 47A are each formed to define bores 130 that are free of threaded engagement with the shaft 12, and slots or notches 132 in which the roller extensions 75 are loosely received.

The retainer rings 45A and 47A are loosely received between the outer race ring flanges 136 and the respective roller ends 56A and 58A, and perform no load or motion transmitting functions. Their purpose is to cooperate with roller extensions 75 to support the rollers 36A adjacent the respective raceway surfaces 60A and 62A when the bearing 16A is separated from the shaft 12. Note that in this embodiment the roller radial surfaces 87A are separate from the roller extensions 75.

In the actuator 10B of FIGS. 9 and 10, the bearing unit 16B is substituted for the bearing unit 16A in the tubular member 12B. Bearing unit 16B is of the shock absorbing type shown in FIGS. 9 and 10 of my said application, but modified to have the 90° angle roller thrust bearing surfacing described in connection with the embodiment of FIGS. 6 and 7 of the present application, as indicated by the reference numerals employed.

In the bearing unit 16B, the retainer rings 45A and 47A are replaced by nut 44 of my said application. The nut 44 is formed to define a bore 150 that is internally threaded as at 152 for threaded engagement with the threading 20 of shaft 12. The nut 44 is formed with an operating cavity or recess 50B for each roller 36, with the respective rollers 36 being received in the respective cavities 50B in the assembled relation of the bearing unit 16B (see FIG. 10). Following the teachings of my said patent the rollers 36B are not journaled in the nut 44, but rather are loosely received in the respective cavities 50B. The nut 44 is formed with a pair of slots 156 at either end of same for each cavity 50B in which the extensions 75 of the respective rollers 36B are loosely received to support the rollers 36B adjacent the outer race rings 66B and 58B when the bearing unit 16B is separated from the shaft 12; as in the previous embodiments, the roller extensions 75 do not serve roller journaling purposes and in practice the extensions 75 are spaced from all surfaces of the nut 44 which define the respective slots 156 when the shaft 12 is operatively applied to the bearing unit 16. The roller extensions 75 come into play, in cooperation with the nut slots 156, when the bearing unit 16B is removed from the shaft. The roller radial surfaces 87A, of course, ride on the race ring surfaces 89A, and roller thrust surfaces 52A and 54A ride on the respective race ring thrust surfaces 60A and 62A.

In the form of bearing unit 16B that is illustrated, the sleeve 69B is shiftedly received in housing 160, with Belleville washer type compression springs 162 and 164 being interposed between the respective race rings 66B and 68B and the housing 160 whereby the nut ends 166 and 168 are held in spaced relation from the respective stop surfaces 170 and 172 of the housing 160. In this embodiment it is the housing 160 that is applied between the lock rings 120 and 122.

Housing 160 in the form shown is composed of the half sections 174 and 176 suitably secured together, as by employing threading indicated at 178.

When shock loads are occasioned acting axially of the shaft 12, either spring 162 or 164 will deflect under load, depending on the direction of application of the shock load. Assuming that the shock load is in the direction of the arrow 180 of FIG. 9 and is acting on the tubular member 12, it is the spring 164 that yields whereby the tubular member 18 moves to the left of shaft 12 to bring the stop surface 172 of the housing 160 against the end 168 of the nut 44, whereby the shock load is transmitted to the shaft 12 through the housing section 176 and nut 44, to the exclusion of the rollers 36B and the outer raceways of the bearing unit 16B. Shock loads acting in the opposite direction on the tubular member 18 act to contract the spring 162 in a similar manner whereby the housing stop surface 170 is brought against the end 166 of the nut 44 for thrust transmitting purposes.

The bearing unit 16C of FIG. 11, which may be substituted for the bearing units 16A and 16B, comprises a plurality of rollers 36C having their shanks 38C formed to define threading 190, in accordance with the arrangement of my U.S. Pat. No. 3,612,221 (the disclosure of which is hereby incorporated herein by this reference). The threading 190 of the rollers 30 is 45° angle threading in meshing relation with the shaft threading 20, when the bearing unit 16C is mounted in operative relation with the shaft 12. The rollers 36C are cooperatively arranged between opposing retainer members 192 and 194 of annular configuration and having their respective flanges 196 and 198 suitably notched to loosely space the rollers 36C from one another. Here again, journaling of the rollers is not required as the meshing of the threading of the rollers with the threading of the shaft holds the rollers in the desired spaced relation about the circumference of the shaft.

The rollers 36C have their ends in rolling tractional relation with race rings 200 and 202, respectively, that are comparable in function with race rings 66A and 68A, respectively. The roller ends are formed with thrust resisting surfaces 52A and 54A, respectively, that cooperate with the thrust transmitting surfaces 60A and 62A of the rings 200 and 202, respectively. The roller radial surfaces 87A are formed by the roller extensions 75 and ride on race ring radial surfaces 89A that merge into the race ring thrust surfaces 60A abd 62A, respectively, at corners 93A. The roller radial and thrust surfaces 87A and 52A and 54A, respectively, merge at corners 91A.

The sleeve 69C houses the rollers 36C and retainer rings 192 and 194. Race rings 200 and 202 are fixed relative to the sleeve 69A by the sleeve having its ends turned over against the outer surfaces of the race rings 200 and 202, as indicated in FIG. 11.

In the embodiment of FIG. 11, the angulation of the thrust surfaces 52A and 54A is at 90° with respect to the axes of the respective rollers 36C and the race ring thrust surfaces 60A and 62A complement this shaping. The roller threading 190 is a single 45° V thread whereby the threading 190 defines on either side of the thread thrust transmitting surfaces 220 and 222 that are angled at 45° relative to the longitudinally extending axes of the respective rollers. The threading 12 of the shaft and the roller threading 190 is given one of the pitch diameter relationships of said U.S. Pat. No. 3,861,221 to provide the net helical angle that defines the lead of the device.

The bearing unit 16C thus has the roller canting opposing functions of the present invention embodied in a threaded roller type linear actuator of the type disclosed in my said U.S. Pat. No. 3,861,221.

It will therefore be seen that the invention provides a motion translating bearing unit and linear actuator device in which the same may be assembled and operated at efficiencies on the order of 95°, that is capable of high load carrying capacities, and that is relatively inexpensive to manufacture. Where shock load resistance is desired, the embodiment of FIGS. 9 and 10 may be employed.

In accordance with the invention, by shaping the roller end thrust bearing surfaces, and the roller flange or threading thrust bearing surfaces, to have the angulation relationships indicated, results in the application to the rollers of sufficient radial forces, when thrust loads are applied thereto, to hold the rollers against canting against forces tending to result in canting up to 25 per cent of the thrust loads employed. The rollers and the outer race rings on which they ride define complementing composite radial-thrust bearing or transmitting surfaces in which the radial and thrust surface are adjacent, contiguous, and merge in complementing corners that are in circumambient relation to the respective structures they are formed in. Such race ring corners are in circumambient relation about the actuator shaft.

The devices of this invention have wide applicability, such as in connection with automobile power seas, automobile power windows, tail gates, and automobile jacks, as well as valve openers and circuit breakers, to mention just a few.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a linear actuator including a threaded shaft member, a bearing unit mounting member having a portion of same disposed in substantial concentric relation to the shaft member, a bearing unit operatively interposed between said mounting member and said shaft member for moving one of said members linearly and axially of said shaft member when the other member is rotated about the longitudinal axis of the shaft member, and means for rotating said other member about said axis of said shaft member, with said bearing unit comprising a plurality of discrete rollers each defining a force transmitting surfacing about each end of same and a plurality of thrust transmitting faces intermediate said bearing surfacings of the respective rollers that are angled relative to the longitudinal axis of the respective rollers and that are in rolling substantially complementing engagement with the shaft member threading, and an outer race structure defining spaced apart raceway surfacings about the shaft member axis about which said roller bearing surfacings ride, with said roller faces being free of engagement with said outer race structure and the mounting member and said rollers being in free rolling nonjournalled relation to said outer race structure, the improvement wherein:

said roller bearing surfacings each define at the respective ends of said rollers:

a radial load transmitting bearing surface and a thrust transmitting bearing surface intermediate said radial load transmitting surface and said faces at the respective ends of the respective rollers, said outer race structure raceway surfacings each defining a radial load transmitting surface on which the respective roller radial load transmitting bearing surfaces respectively ride and a thrust transmitting surface on which the respective roller thrust transmitting bearing surfaces respectively ride in substantial complemental relation thereto, said roller thrust transmitting bearing surfaces at either end of the respective rollers being substantially equally angled relative to the longitudinal axis of the respective rollers and at an angulation up to ninety degrees that exceeds said roller thrust transmitting face angulation.

2. The improvement set forth in claim 1 wherein: said angulation of said roller thrust transmitting faces is 45°, with said angulation of said roller thrust transmitting bearing surfaces being approximately 75°.

3. The improvement set forth in claim 1 wherein: the shaft member threading is formed by 45° angle threads, with said angulation of said roller thrust transmitting bearing surfaces being 90°.

4. The improvement set forth in claim 1 wherein: said plurality of thrust transmitting faces of the respective rollers are formed by right flanges integral with the respective rollers.

5. The improvement set forth in claim 1 wherein: said plurality of thrust transmitting faces of the respective rollers are formed by threading integral with the respective rollers.

6. The improvement set forth in claim 1 wherein: said thrust transmitting and radial load bearing surfaces of said rollers at either end of same are contiguous and merge into each other at circumambient corners to form said surfacing at either end of said rollers.

7. In a linear actuator including a threaded shaft member, a bearing unit mounting member having a portion of same disposed in substantial concentric relation to the shaft member, a bearing unit operatively interposed between said mounting member and said shaft member for moving one of said members linearly and axially of said shaft member when the other member is rotated, and means for rotating said other member about the axis of said shaft member, with said bearing unit comprising a plurality of discrete rollers each defining a force transmitting surfacing about each end of same and a plurality of thrust transmitting faces intermediate said bearing surfacings of the respective rollers that are angled relative to the longitudinal axis of the respective rollers and that are in rolling substantially complementary engagement with the shaft member threading, and an outer race structure defining spaced apart raceway surfacings about the shaft member axis about which said roller bearing surfacings ride, with said roller faces being free of engagement with said outer race structure and the mounting member and said rollers being in free rolling nonjournalled relation to said outer race structure, the improvement wherein:
said roller bearing surfacings each define at the respective ends of said rollers:
contiguous radial load and thrust transmitting bearing surface segments of which the thrust surface segments thereof are angled relative to the longitudinal axis of the respective rollers and the radial surface segments parallel the longitudinal axis of the respective rollers,
said outer race structure raceway surfacings defining spaced annular raceways that are substantially complemental to the respective roller surface segments riding on same,
with the angle of departure of the angulation of said roller thrust surface segments from right angle positioning relative to said axis of the respective rollers being less than said angulation of said faces.

8. In a linear actuator including a threaded shaft member, a bearing unit mounting member having a portion of same disposed in substantial concentric relation to the shaft member, a bearing unit operatively interposed between said mounting member and said shaft member for moving one of said members linearly and axially of said shaft member when the other member is rotated, and means for rotating said other member about the axis of said shaft member, with said bearing unit comprising a plurality of discrete rollers each defining a force transmitting surfacing about each end of same and a plurality of thrust transmitting faces intermediate said bearing surfacings of the respective rollers that are angled relative to the longitudinal axis of the respective rollers and that are in rolling substantially complementing engagement with the shaft member threading, an outer race structure defining spaced apart raceway surfacings about the shaft member axis about which said roller bearing surfacings ride, with said roller faces being free of engagement with said outer race structure and the mounting member and said rollers being in free rolling nonjournalled relation to to said outer race structure, and a roller support about which said rollers are received in free rolling nonjournalled relation thereto, said support being formed to be received over the shaft, said rollers having projecting end portions and said support being formed for cooperation with said roller end portions to support the rollers against substantial radial displacement radially inwardly of said raceways when the bearing unit is free of the shaft, the improvement wherein:
said roller bearing surfacings each define at the respective ends of said rollers:
a thrust bearing surface angled relative to the roller longitudinal axis, and a radial load surface that is contiguous to the respective roller thrust bearing surfaces,
said outer race structure raceway surfacings defining spaced apart raceway surfaces that are substantially complemental to the respective roller surfaces riding on same,
said angulation of said roller thrust bearing surfaces being so greater than ninety degrees but being greater than said angulation of said thrust transmitting faces.

9. The improvement set forth in claim 8 wherein:
said support is threaded for threaded engagement with the shaft threading,
with the ends of the support serving as abutments for application of shock loads thereto.

10. The bearing unit set forth in claim 9 wherein:
said support comprises a pair of spaced apart rings,
with said rollers and outer race structure being formed to loosely mount said rings in cooperative radial holding relation with the respective roller end portions.

* * * * *